(12) United States Patent
Okajima et al.

(10) Patent No.: US 7,845,529 B2
(45) Date of Patent: Dec. 7, 2010

(54) METHOD FOR PROCESSING SUBSTRATE, APPARATUS FOR PROCESSING SUBSTRATE, METHOD FOR CONVEYING SUBSTRATE AND MECHANISM FOR CONVEYING SUBSTRATE

(75) Inventors: Yasutomo Okajima, Osaka (JP); Katsuyoshi Nakata, Osaka (JP)

(73) Assignee: Mitsuboshi Diamond Industrial Co., Ltd., Osaka (JP)

(*) Notice: Subject to any disclaimer, the term of this patent is extended or adjusted under 35 U.S.C. 154(b) by 0 days.

(21) Appl. No.: 12/476,336

(22) Filed: Jun. 2, 2009

(65) Prior Publication Data
US 2009/0236384 A1 Sep. 24, 2009

Related U.S. Application Data

(62) Division of application No. 10/581,557, filed on Jun. 2, 2006, now abandoned.

(51) Int. Cl.
*B26F 3/00* (2006.01)
(52) U.S. Cl. ...................... 225/96.5; 414/763
(58) Field of Classification Search ............... 82/103, 82/408; 225/2, 96.5, 97; 414/761–763
See application file for complete search history.

(56) References Cited

U.S. PATENT DOCUMENTS

| | | | |
|---|---|---|---|
| 3,862,749 A * | 1/1975 | Fieser et al. ............... 148/202 |
| 4,140,258 A | 2/1979 | Gray |
| 5,332,406 A | 7/1994 | Takeuchi et al. |
| 5,855,468 A * | 1/1999 | Cagle et al. ............... 414/761 |
| 7,033,857 B2 | 4/2006 | Munakata et al. |
| 7,128,516 B2 | 10/2006 | Sugiyama et al. |
| 7,131,562 B2 | 11/2006 | Ueyama et al. |
| 2004/0155085 A1 | 8/2004 | Takamatsu et al. |

FOREIGN PATENT DOCUMENTS

| JP | 11-116260 | 4/1999 |
|---|---|---|
| JP | 11347779 | * 12/1999 |

* cited by examiner

*Primary Examiner*—Kenneth E. Peterson
(74) *Attorney, Agent, or Firm*—Antonelli, Terry, Stout & Kraus, LLP.

(57) ABSTRACT

A method and an apparatus process a substrate to divide a mother substrate into unit substrates. The apparatus is provided with a scribing portion for drawing a scribe line on a mother substrate, a breaking portion for breaking a mother substrate along the formed scribe line, and a portion for conveying a substrate for conveying a mother substrate or a unit substrate at least between the above described respective portions, wherein portion for conveying a substrate has a number of rotational supports and with a suction surface for sucking and holding each substrate from a main surface, rotational supports and have rotational axes, as well as suction members for respectively sucking and rotating a substrate which rotates substrates around rotational axes approximately simultaneously in such a manner that at least two main surfaces of each substrate are turned over in the upward and downward direction.

3 Claims, 12 Drawing Sheets

METHOD FOR PROCESSING SUBSTRATE, APPARATUS FOR PROCESSING SUBSTRATE, METHOD FOR CONVEYING SUBSTRATE AND MECHANISM FOR CONVEYING SUBSTRATE

CROSS-REFERENCE TO RELATED APPLICATION

This application is a divisional application of U.S. application Ser. No. 10/581,557, filed Jun. 2, 2006, now abandoned the contents of which are incorporated herein by reference.

TECHNICAL FIELD

This invention relates to a method for conveying a substrate according to which a substrate is turned over and conveyed, an apparatus for conveying a substrate, as well as a method for processing a substrate using this method and apparatus and an apparatus for processing a substrate. The invention particularly relates to a method for processing a substrate according to which a scribe line is drawn on a mother substrate and the above described mother substrate is divided into unit substrates along the drawn scribe line, and an apparatus for processing a substrate.

BACKGROUND TECHNOLOGY

In recent years, the use of flat panel displays that are thin and can display in a small display area has been spreading. In liquid crystal display panels, which are one type of panel for such flat panel displays (FPD), two glass substrates are bonded together and liquid crystal is injected into the gap between these, and thus, a display panel is formed. Bonded mother substrates where glass substrates are bonded together are usually divided into a predetermined size by means of an apparatus for processing substrates.

"Divide" means to draw a scribe line (cutting line) on a substrate, and then apply force to the substrate where the scribe line has been drawn, so that the substrate is broken along the scribe line.

In addition, the term "divide" includes cases where a substrate is separated along a scribe line or becomes of a state immediately before separation as a result of the scribe line being drawn using a blade that can cause deep vertical cracking.

Patent Document 1 (Japanese Unexamined Patent Publication H11 (1999)-116260) discloses an apparatus for processing glass using which a bonded mother substrate can be scribed and divided into a desired size.

Patent Document 1: Japanese Unexamined Patent Publication H11 (1999)-116260

Meanwhile, liquid crystal display panels for television receivers and monitors of personal computers have been increasing in size year by year, and mother substrates which are used for the production of liquid crystal display panels have also been increasing in size year by year. Such large scale mother substrates are divided, and thereby, a large number of unit substrates are manufactured. In the process for manufacturing a large number of unit substrates from a large scale mother substrate, an apparatus for conveying a substrate is used in order to convey mother substrates and unit substrates between respective stages.

Apparatuses for conveying a substrate are usually provided with a vacuum suction mechanism which can suck a substrate as those described above through vacuum, a mechanism for turning a substrate over, in which a substrate that has been sucked by the vacuum suction mechanism through vacuum is turned over, and at least one conveying robot which has a moving mechanism for supporting and moving these mechanisms in the direction of the X axis and the Y axis.

When a mother substrate is divided, first a cutter wheel chip is rolled over a mother substrate on top of a table in a state where a predetermined scribing pressure is applied, and thereby, a scribe line is drawn on side A, which is one side of the substrate. Next, the substrate is sucked and turned over, and after that, pressure is applied with a breaking bar or the like to side B of the substrate, which is the rear side of side A of the substrate, so that side A of the substrate is broken. Next, in the same manner as in the above, a scribe line is drawn on side B of the substrate, and the substrate is sucked and turned over, and after that, pressure is applied with a breaking bar or the like to side A of the substrate, so that side B of the substrate is broken. Alternatively, a scribe may be drawn on side A of a substrate, and then, the substrate may be sucked and turned over, and after that, a scribe line may be drawn on side B of the substrate, and subsequently, pressure may be applied with a breaking bar or the like to side B of the substrate, so that side A of the substrate is broken, and the substrate may be sucked and turned over, and after that, pressure may be applied with a breaking bar or the like to side A of the substrate, which is the rear side of side B of the substrate, so that side B of the substrate is broken.

DISCLOSURE OF THE INVENTION

Problem to Be Solved by the Invention

As mother substrates which are used for liquid crystal display panels increase in size, however, vacuum suction mechanisms for sucking a mother substrate through vacuum and mechanisms for turning over a substrate using which a substrate that is sucked by a vacuum suction mechanism through vacuum also increase in size. so that apparatuses which are required to turn over a substrate increase in size. Accordingly, the area where an apparatus is installed increases.

In addition, as mother substrates which are used for liquid crystal display panels increase in size, warping which occurs in a substrate when this substrate is turned over increases, causing warping inside the substrate, and thereby, there is a risk that the distribution of the gap spacers between the two substrates in the bonded substrate may become uneven.

This invention is provided in view of these problems with the prior art, and an object thereof is to prevent substrates from being damaged during substrate conveyance which includes turning over of a substrate, and to reduce the area for installation by miniaturizing apparatuses for processing a substrate which have such a mechanism for conveying a substrate.

Means for Solving Problem

This invention provides a method for processing a substrate which includes the step of drawing a scribe line on a mother substrate and dividing the mother substrate along the drawn scribe line, characterized in that when a mother substrate or a small mother substrate which is a portion that has been divided from a mother substrate is conveyed, the above described mother substrate or the above described small mother substrate is held through suction of a main surface of the above described mother substrate or the above described small mother substrate using a number of suction members, each of which is provided with a suction surface, and then, all of the above described suction members are rotated approximately simultaneously, and thereby, the two main surfaces of the above described mother substrate or the above described small mother substrate are turned over in the upward and downward direction.

Another aspect of the present invention provides an apparatus for processing a substrate which divides a mother substrate or a small mother substrate which is a portion that has been divided from a mother substrate into unit substrates, comprising a scribing portion for drawing a scribe line on a mother substrate or a small mother substrate, and a breaking portion for breaking the above described mother substrate or the above described small mother substrate along the drawn scribe line; and a substrate conveying portion for conveying the above described mother substrate or the above described small mother substrate at least between the above described respective portions, characterized in that the substrate conveying portion has a number of suction members which are provided with a suction surface for sucking and holding a mother substrate and a small mother substrate from a main surface, and the suction members have rotational axes and means for sucking and rotating a substrate which rotate mother substrates or small mother substrates around the respective rotational axes approximately simultaneously in a state where the above described mother substrates or the above described small mother substrates are being sucked in such a manner that at least the two main surfaces of each substrate turns over in the upward and downward direction.

Still another aspect of the present invention provides a conveying mechanism for conveying a mother substrate or a small mother substrate which is a portion that has been divided from a mother substrate when the above described mother substrate or the above described small mother substrate is processed, comprising a number of suction members with a suction surface for sucking and holding a mother substrate or a small mother substrate from a main surface, wherein the suction members have rotational axes and means for sucking and rotating a substrate which rotate mother substrates or small mother substrates around the respective rotational axes approximately simultaneously in a state where the above described mother substrates or the above described small mother substrates are being sucked in such a manner that at least the two main surfaces of each substrate turns over in the upward and downward direction.

As for the substrate to which a method for processing a substrate and an apparatus for processing a substrate according to the present invention are applied, fragile material substrates, such as glass, ceramics, single crystal silicon, sapphire, semiconductor wafers and ceramics substrates, as well as plastic substrates, can be cited. In addition, such substrates include single substrates, bonded substrates and layered substrates where a number of substrates are layered. In addition, substrates to which a metal film and a resin film for forming a circuit pattern and electrodes are attached are also included.

As for concrete applications of the substrates which are manufactured by applying a method for processing a substrate and an apparatus for processing a substrate according to the present invention, panels for a flat panel display, such as liquid crystal display panels, plasma display panels, organic EL display panels and the like can be cited.

Effects of the Invention

In a method for processing a substrate and an apparatus for processing a substrate according to this invention, a mother substrate on which a scribe line has been drawn is sucked and held from a main surface using a number of suction members, each of which has a suction surface when the mother substrate is conveyed, and then, the above described suction members respectively rotated almost simultaneously, and thereby, at least two main surfaces of the mother substrate are turned over in the upward and downward direction, and therefore, the area that is required for turning over a substrate becomes small, and the time required for turning over a substrate becomes shorter. In addition, warping that occurs in a substrate when the substrate is turned over can be reduced, and therefore, warping inside the substrate can be suppressed, and thereby, unevenness can be prevented from occurring in the distribution of gap spacers between two substrates in a bonded substrate. Furthermore, it becomes possible to reduce the dimensions of the apparatus that is required for turning over a substrate, and the area for installment of the apparatus can be reduced.

In the above described method for processing a substrate, in the case where the respective suction members are rotated around rotational axes which are parallel to each other, extend in the longitudinal direction of the suction members and pass through approximately the center portions of the suction members in the width in the direction perpendicular to the longitudinal direction, the substrates can be rotated with a minimal rotational track and warping which occurs in a substrate at the time of rotation can be minimized, and thereby, the substrate can be prevented from being damaged.

In the above described method for processing a substrate, in the case where a mother substrate is divided in advance into small mother substrates in stripe form, and each of the divided small mother substrates in stripe form is sucked and held by any one suction member, two surfaces of a small mother substrate can be turned over in the upward and downward direction without dividing the substrate. In addition, the area that is required for turning over a small mother substrate in stripe form can be reduced, and the time required for turning over a substrate can be reduced.

Furthermore, the step of sequentially carrying out division of a mother substrate and conveyance of a mother substrate and a small mother substrate can be carried out consistently in one apparatus.

In the above described method for processing a substrate, in the case where a number of suction members, each of which having a suction surface, are used in such a manner that the suction members are rotated around rotational axes which are parallel to each other, extend in the longitudinal direction of the suction members and pass through approximately the center portion of each suction member in the width in the direction perpendicular to the longitudinal direction, a mother substrate or a small mother substrate is sucked and held from a main surface, and then, the distance between the axis lines of the respective rotational axes of adjacent suction members is changed before or at the time when the suction members are rotated, mother substrates can be sucked and held or rotated without making contact with each other, even when the size of and intervals between mother substrates are different from each other when placed on a table.

In the above described apparatus for processing a substrate, in the case where the rotational axes of the respective suction members are parallel to each other, extend in the longitudinal direction of the suction members, and pass through approximately the center portion of each suction member in the width in the direction perpendicular to the longitudinal direction, a substrate can be rotated with a minimal rotational track, and warping which occurs in a substrate at the time of rotation can be minimized, and thereby, the substrate can be prevented from being damaged.

In the above described apparatus for processing a substrate, in the case where at least one suction member has a porous suction surface, the amount of leakage of air from the above described suction surface is relatively low, making suction of the substrate possible even when the area of the suction surface of the suction member is greater than the contact area of the substrate that makes contact with the above described suction surface. Accordingly, substrates having different sizes can be sucked and turned over.

In the above described apparatus for processing a substrate, in the case where at least one suction member having a suction surface of which the size is different is provided, the number of suction members used can be changed on the basis of the size of the sucked substrate, and thus, substrates of various sizes can be conveyed.

In the case where the means for sucking and rotating a substrate has a portion for driving a rotational axis which rotates the rotational axis of a suction member and a portion for shifting a rotational axis which changes the distance between the axis lines of the rotational axes of adjacent suction members before or at the time when the rotational axes are rotated, mother substrates which are placed at equal intervals can be sucked and held or rotated without making contact with each other, even when the interval between mother substrates is different between the table from which the substrates are conveyed and the table to which the substrates are conveyed.

In the above described apparatus for processing a substrate, the scribing portion further has a positioning mechanism for positioning and aligning a substrate which has been rotated by a suction member on a main surface of the adjacent table, and therefore, the substrate that has been precisely positioned by the positioning mechanism can be turned over and conveyed with precision to the location on the table where the substrate is to be mounted.

In the above described apparatus for processing a substrate, in the case where the breaking portion is provided with a first conveyor for conveying a mother substrate on which a scribe line is drawn or a small mother substrate, and a member for pressing a substrate which is placed in the vicinity of at least one end of the first conveyor in the direction of conveyance, presses an end of a mother substrate or a small mother substrate which has been conveyed by the first conveyor and protrudes from the end of the conveyor in the direction of conveyance, and thereby, breaks the substrate into unit substrates, the mechanism for breaking a substrate and a mechanism for conveying a broken substrate can be implemented as one mechanism.

In addition, the apparatus for processing a substrate may be an apparatus for processing a substrate which divides a mother substrate or a small mother substrate which is a portion that has been divided from a mother substrate, comprising a scribing portion for drawing a scribe line on a mother substrate or a small mother substrate, and a portion for conveying a substrate which conveys a mother substrate and a small mother substrate and breaks the above described mother substrate or the above described small mother substrate along the drawn scribe line, wherein the portion for conveying a substrate has a number of suction member units, and each suction member unit is supported by a portion for supporting a unit with a mechanism for adjusting the distance between units which changes the distance between suction member units, each suction member unit has a number of suction members with a suction surface for sucking and holding a mother substrate or a small mother substrate from a main surface, and the suction members have rotational axes and means for sucking and rotating a substrate which rotate mother substrates or small mother substrates around the respective rotational axes approximately simultaneously in a state where the above described mother substrates or the above described small mother substrates are being sucked in such a manner that at least the two main surfaces of each substrate turns over in the upward and downward direction.

In this apparatus for processing a substrate, a number of suction members suck and hold a mother substrate or a small mother substrate from a main surface. Next, the means for sucking and rotating a substrate respectively rotates the above described suction members approximately simultaneously (at this time, in the case where the mother substrate is larger than the suction surface of a suction member, a portion of the scribe line is placed between suction members in advance, and thereby, shearing force works on this scribe line at the time of rotation, and the mother substrate is divided at the same time), and thereby, at least two main surfaces of the above described mother substrate are turned over in the upward and downward direction. Furthermore, the mechanism for adjusting the distance between units in the portion for supporting a unit makes the distance between suction member units larger, and thereby, the mother substrate or the small mother substrate is divided along the scribe line on the substrate that is drawn in a region between suction member units.

Accordingly, the above described portion for conveying a substrate can also function as a breaking portion, and therefore, the area occupied by an apparatus that is required for turning over a substrate can be reduced.

Here, in the case where the rotational axes of the suction members of the respective suction member units in the above described apparatus for processing a substrate are parallel to each other, extend in the longitudinal direction of the suction members and pass through approximately the center portion of each suction member in the width in the direction perpendicular to the longitudinal direction, a substrate can be rotated with a minimal rotational track, and warping which occurs in the substrate at the time of rotation can be minimized, and thereby, the substrate can be prevented from being damaged.

Furthermore, the means for sucking and rotating a substrate may have a portion for driving a rotational axis which rotates the rotational axis of a suction member and a portion for shifting a rotational axis which changes the distance between the axis lines of the rotational axes of adjacent suction members before or at the time when a rotational axis is rotated.

The portion for shifting a rotational axis changes the distance between the axis lines, and thereby, carries out adjustment on the basis of the size of a number of mother substrates or small mother substrates which are mounted on a table, even when the size of the substrates and the intervals between the mounted substrates are different.

Furthermore, substrates and scribe lines are set so that scribe lines are located on substrates between the suction members, and thereby, the portion for shifting a rotational axis can divide a substrate along the scribe line.

Furthermore, the direction in which the portion for shifting a rotational axis changes the distance between rotational axes and the direction in which a mechanism for adjusting the distance between units of a portion for supporting a unit changes the distance between suction member units may be perpendicular to each other.

As a result of this, a mother substrate or a small mother substrate can be divided in the directions in which the portion for shifting a rotational axis divides a substrate and a mechanism for adjusting the distance between units divides the substrate, and which are perpendicular to each other.

In addition, in a conveying mechanism in accordance with another aspect of the present invention, the area occupied by the apparatus that is required for turning over a substrate can be reduced, and the area for installation of the conveying mechanism can be reduced. Furthermore, warping which occurs in a substrate when the substrate is turned over can be reduced, and therefore, cracking and chipping, which are not preferable, can be prevented from occurring.

In the above described conveying mechanism, rotational axes of the respective suction members may be parallel to each other, extend in the longitudinal direction of the suction members, and pass through approximately the center portion in the width of each suction member in the direction perpendicular to the longitudinal direction.

In addition, the conveying mechanism may be a conveying mechanism which conveys a mother substrate or a small mother substrate which is a portion that has been divided from a mother substrate when the above described mother substrate or the above described small mother substrate is processed, which has a number of suction member units where each suction member unit is supported by a portion for supporting a unit with a mechanism for adjusting the distance between units which changes the distance between suction member units, and each suction member unit has a number of suction members with a suction surface for sucking and holding a mother substrate or a small mother substrate from a main surface, and the respective suction members have rotational axes and means for sucking and rotating a substrate which rotate mother substrates or small mother substrates around the respective rotational axes approximately simultaneously in a state where the above described mother substrates or small mother substrates are sucked and held in such a manner that at least two main surfaces of each substrate are turned over in the upward and downward direction.

In the above described conveying mechanism, the rotational axes of the suction members of each suction member unit may be parallel to each other, extend in the longitudinal direction of the suction members, and pass through approximately the center portion in the width of each suction member in the direction perpendicular to the longitudinal direction.

In addition, in the above described conveying mechanism, the means for sucking and rotating a substrate may have a portion for driving a rotational axis which rotates the rotational axis of a suction member and a portion for shifting a rotational axis which changes the distance between the axis lines of the rotational axes of adjacent suction members before or at the time when a rotational axis is rotated.

EXPLANATION OF SYMBOLS

Figure 1:
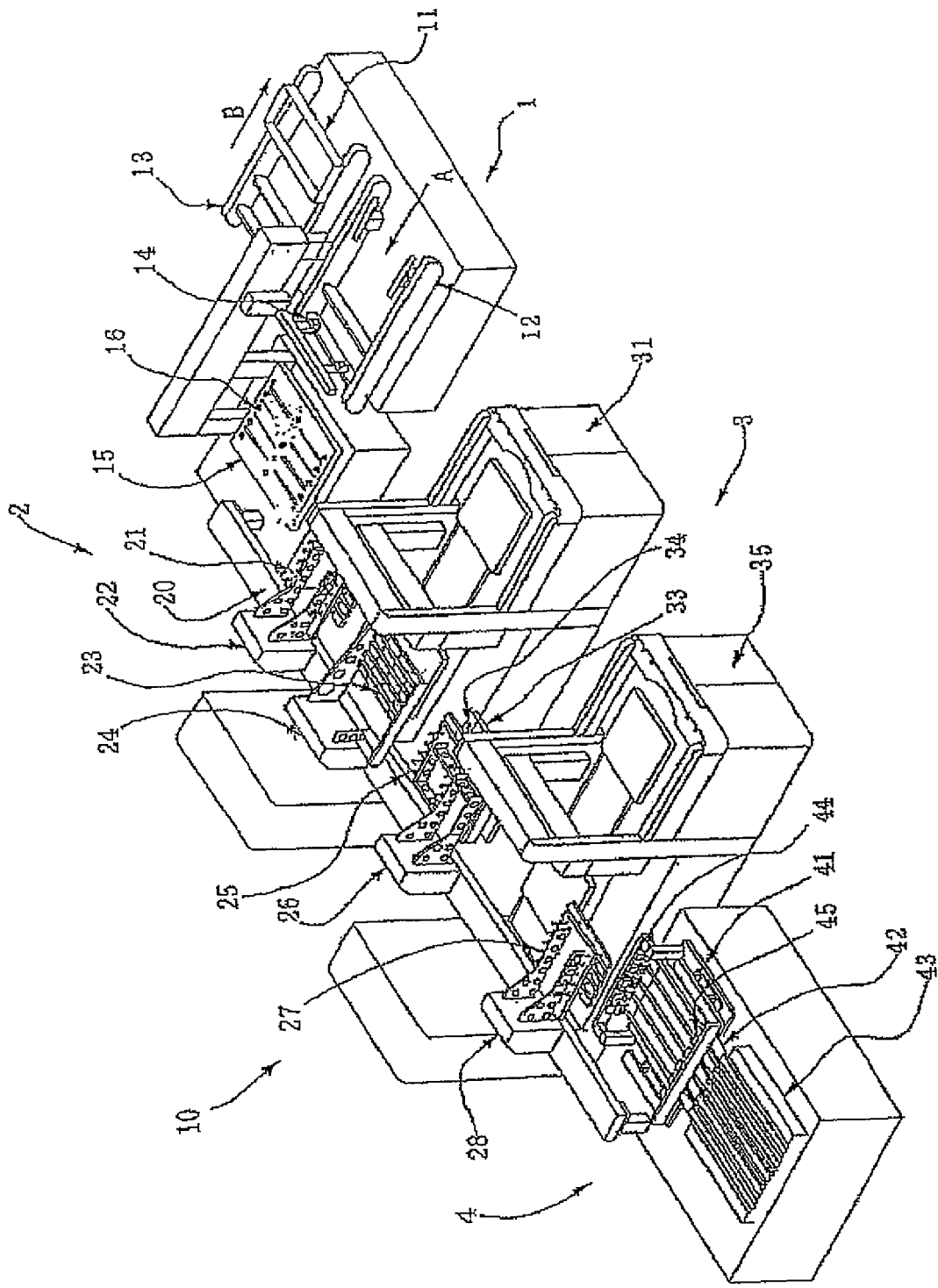
FIG. 1 is a perspective diagram showing an apparatus for processing a substrate according to this invention as viewed from the left.

1: Portion for mounting a substrate
2: Portion for conveying a substrate
3: Scribing portion
4: Breaking portion
10: Apparatus for processing a substrate
22: Robot for conveying a substrate
23: Portion for turning over and sucking a substrate
24: Robot for conveying a substrate
26: Robot for conveying a substrate
28: Robot for conveying a substrate
31: Scribing table
35: Scribing table
41: Breaking conveyor
51: Rotational support
52: Rotational axis
70: Portion for turning over and sucking a substrate
72: Rotational axis
73: Rotational support
75: Cylinder
76: Rack and pinion
78: Rail

BEST MODE FOR CARRYING OUT THE INVENTION

In the following, the embodiments of this invention are described in reference to the drawings.

Here, in the present invention, "substrates" are categorized and defined, depending on the dimensions thereof, as mother substrates having the maximum dimensions before the dividing process, small mother substrates, which are substrates, for example, in stripe form, and are portions that have been divided from a mother substrate, and unit substrates, which are substrates having the minimum unit area that have been divided from a small mother substrate. In addition, according to the present invention, "substrates" include, depending on the form thereof, single substrates made of one piece of a substrate, bonded substrates, where a pair of substrates are bonded together, and layered substrates, where a number of substrates are layered.

In the following embodiments, though an example where a mother substrate or a small mother substrate, in which a pair of glass substrates are bonded, is divided into unit substrates, when a panel substrate for a liquid crystal display is manufactured, the apparatus for processing a substrate and a method for processing a substrate according to this invention are not limited to this, but rather can be applied to industrial machines in general which require a conveying mechanism.

First Embodiment

In the following, the first embodiment of this invention is described in detail in reference to FIGS. 1 to 7.

Figure 2:
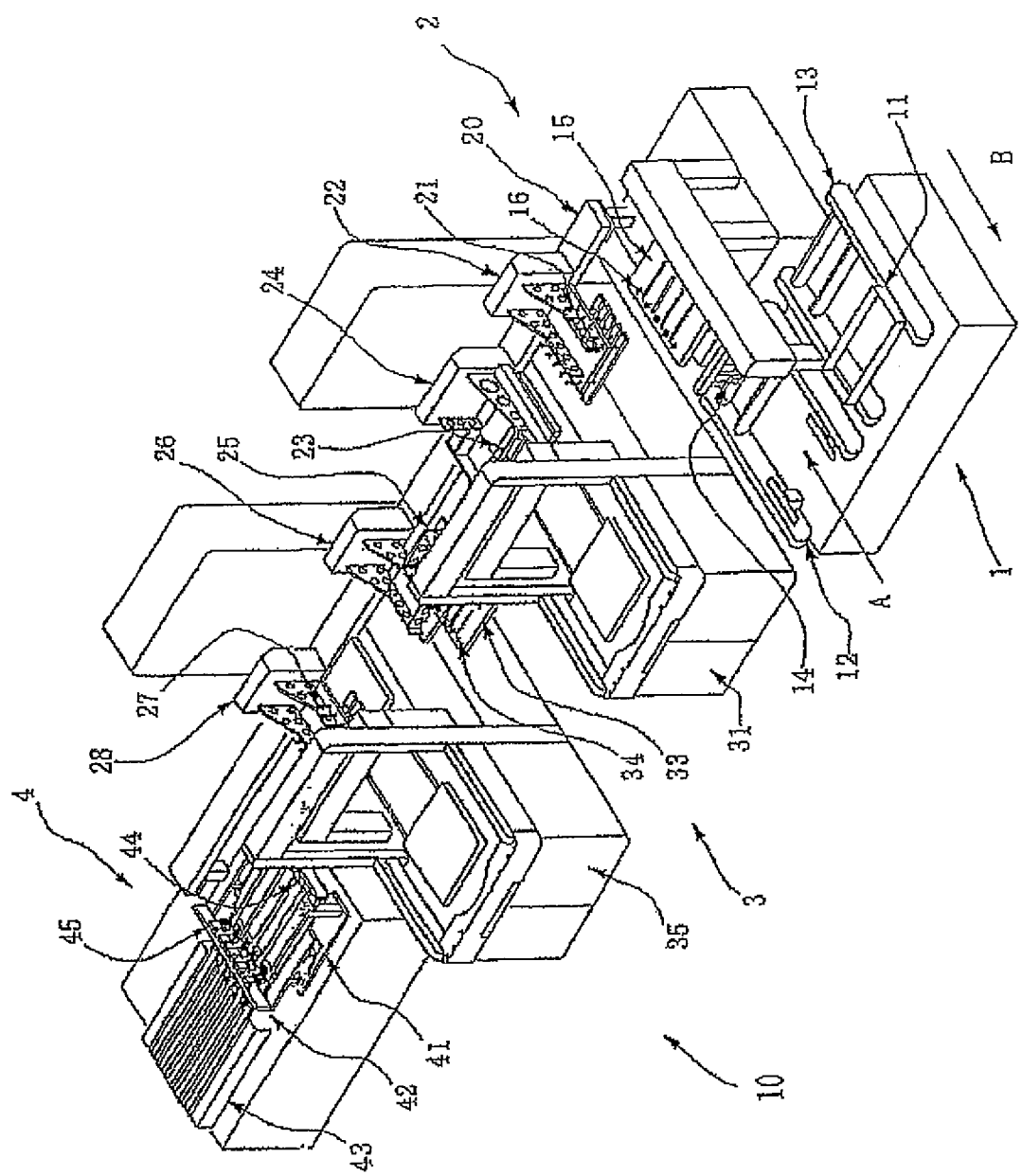
FIG. 2 is a perspective diagram showing the apparatus for processing a substrate of FIG. 1 as viewed from the right.

FIG. 1 is a perspective diagram showing an apparatus for processing a substrate according to this invention as viewed from the left, and FIG. 2 is a perspective diagram showing the above described apparatus for processing a substrate as viewed from the right.

In FIGS. 1 and 2, an apparatus for processing a substrate 10 is mainly formed of a portion for mounting a substrate 1, where a fragile substrate is mounted, a portion for conveying a substrate 2, having a number of robots for conveying a substrate, a scribing portion 3, which scribes a substrate that has been conveyed by portion for conveying a substrate 2, and a breaking portion 4 for breaking a scribed substrate.

Examples of the configuration and the operation of apparatus for processing a substrate 10 are described in reference to FIGS. 1 and 2.

First, a cassette 11 for conveying a substrate is supplied in the direction of arrow A in the figure, and is carried by a conveyor 12 to the front of a sucking hand 14. In cassette 11, a number of small mother substrates, in which two glass plates are bonded together, are aligned so that the faces become parallel to each other in a state where the shorter sides thereof stand approximately vertically. Here, in this embodiment, small mother substrates in stripe form that have been divided from a mother substrate (for example, 2 m×1 m) and of which the longer sides do not exceed 1 m, for example, glass substrates of 670 mm×100 mm×0.7 mm, are used.

Next, sucking hand 14 sucks substrates one by one and transfers them to a support 15 from cassette 11 that has been carried to the rear-end portion of conveyor 12. This operation is repeated, for example, five times, and thereby, five substrates, which are small mother substrates, are mounted on support 15 in line with the main surfaces thereof being parallel to the main surface of the support 15. Positioning members 16 are placed on support 15, and thereby, small mother substrates are positioned at predetermined positions on support 15. Here, empty cassette 11 is conveyed in the direction of arrow B in the figure by conveyor 13.

Next, a robot for conveying a substrate 22, having a portion for sucking the upper surface of a substrate 21 which sucks the upper surface (main surface on the side that does not make contact with support 15) of a small mother substrate and supports the substrate, moves to support 15 along the top of a guide rail 20. Portion for sucking the upper surface of a substrate 21 sucks and supports five small mother substrates in line at the same time, moves them to a scribing table 31 and mounts the small mother substrates on scribing table 31. During that time, another set of five small mother substrates is mounted so as to be in line on support 15 by means of sucking hand 14. On scribing table 31, a scribe line is drawn on surface A, which is one surface of a small mother substrate.

A configuration where a single or a number of scribe heads having a wheel cutter for scribing are provided can be adopted for scribing table 31. In addition, it is preferable for the table to be of a rotational system or for the scribe heads to be of a rotational system so that scribe lines can be drawn in two directions which are perpendicular to each other on the table.

As for the wheel cutters for scribing, glass wheel cutters of Japanese Patent No 3074143 are preferable.

Next, a robot for conveying a substrate 24 moves to scribing table 31 along the top of guide rail 20. Robot for conveying a substrate 24 has a portion for turning over and sucking a substrate 23, which supports a small mother substrate of which the main surface is sucked by a number of sucking surfaces that turn over 180° upside down almost simultaneously.

Figure 3:
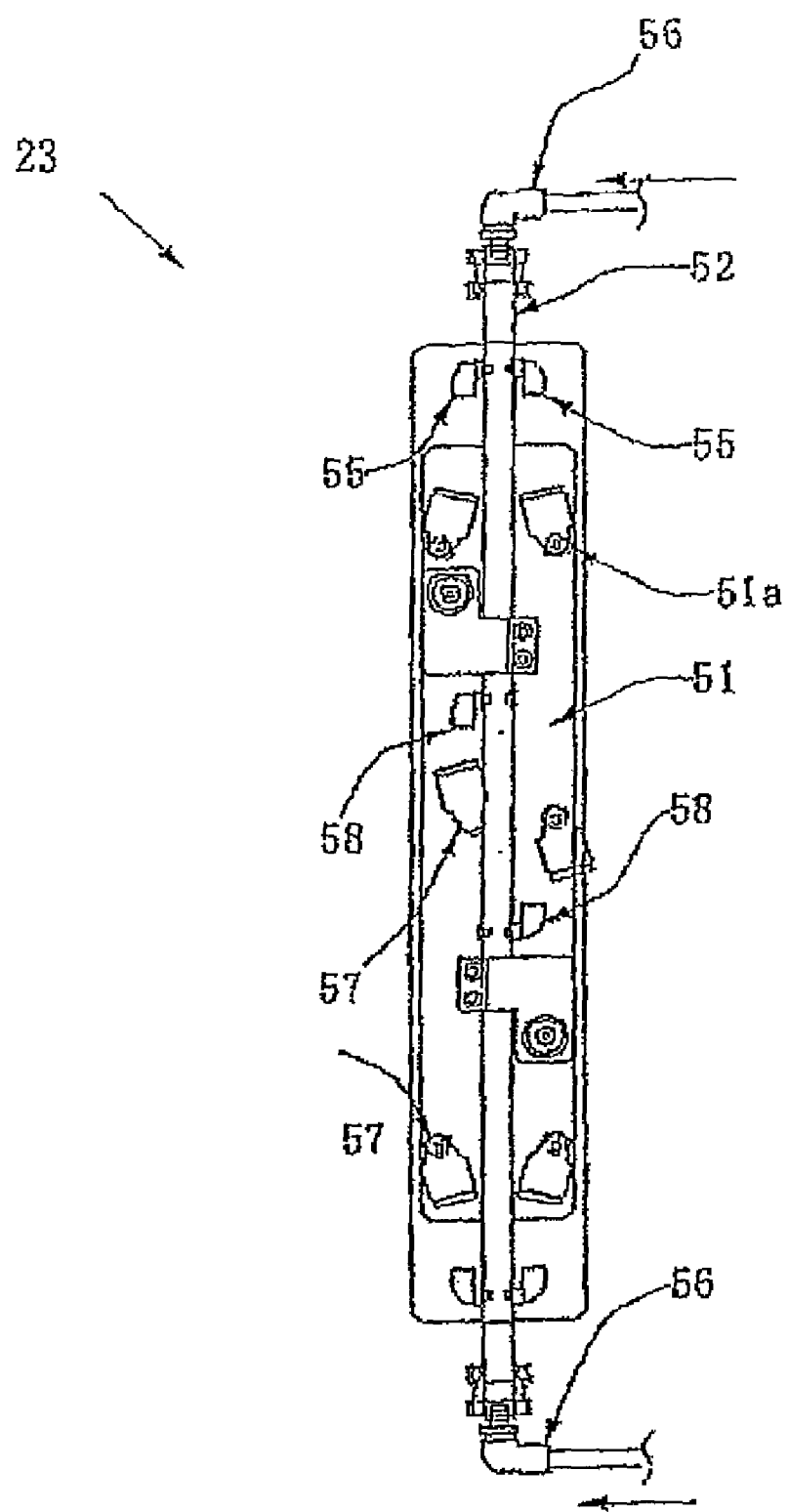
FIG. 3 is a plan diagram showing a portion for turning over and sucking a substrate of the apparatus for processing a substrate of FIG. 1.
Figure 4:
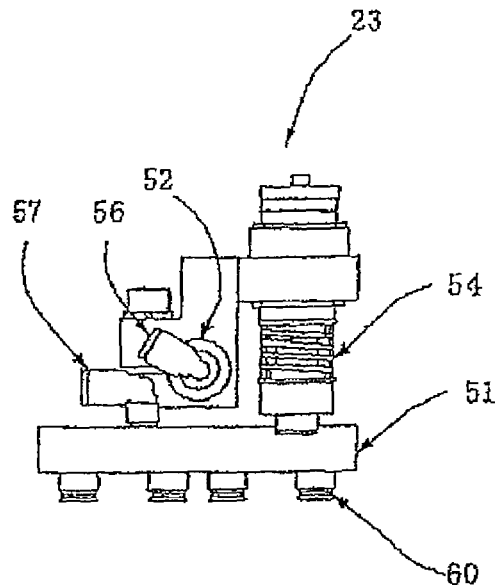
FIG. 4 is a side diagram showing the portion for turning over and sucking a substrate of the apparatus for processing a substrate of FIG. 3.

FIGS. 3 and 4 are a plan diagram and a side diagram showing portion for turning over and sucking a substrate 23.

The configuration of portion for turning over and sucking a substrate 23 is described in reference to FIGS. 3 and 4.

Portion for turning over and sucking a substrate 23 is provided with a rotational support 51, a rotational axis 52 in pipe form and a number of sucking bellows 60 which form a sucking surface.

Rotational support 51 has a number of holes 51a on the surface and is supported by rotational axis 52 via a support 54 having elasticity. Holes 51a in rotational support 51 connect to sucking bellows 60 on the rear surface.

Rotational axis 52 has holes 55 which are dispersed in the longitudinal direction and is connected to the below described portion for driving the rotation, which is placed at one end of the axis. Both ends of rotational axis 52 are connected to a vacuum source, not shown, via rotary joints 56. Holes 55 of rotational axis 52 connect to holes 51a of rotational support 51 via a tube 58 and an electromagnetic valve 57. When the above described vacuum source is driven, electromagnetic valve 57 is switched, and thereby, it becomes possible to suck a substrate using arbitrary sucking bellows 60. That is to say, it is possible to switch the dimensions of the sucking surface depending on the size of the substrate.

Figure 5:
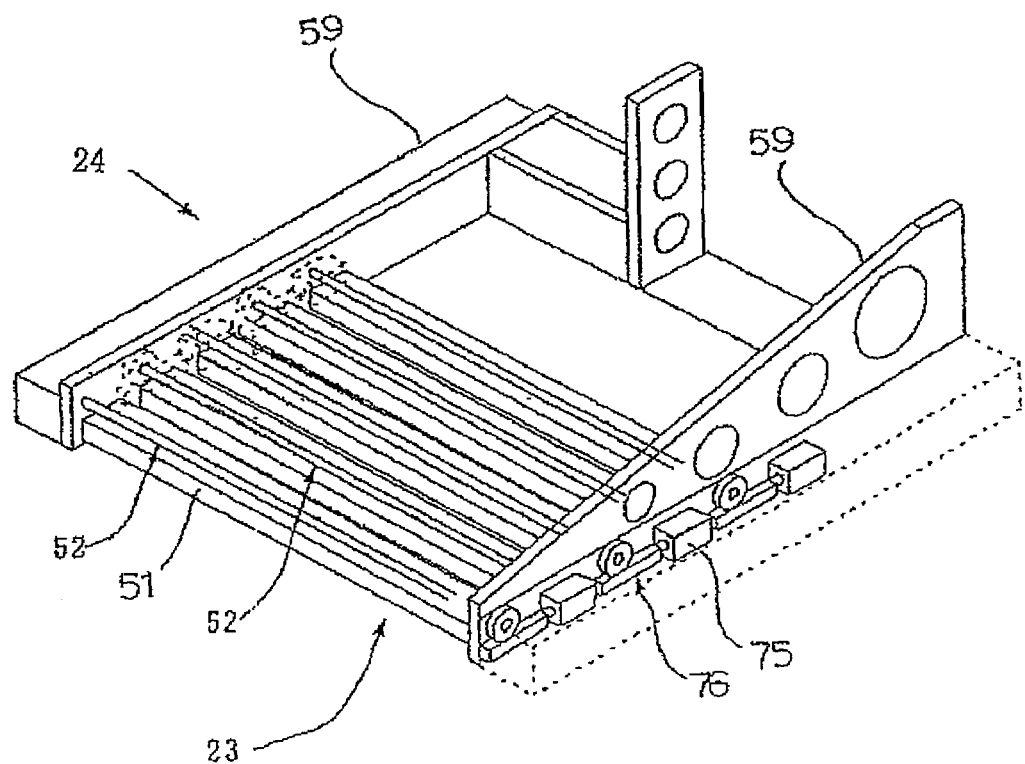
FIG. 5 is a perspective diagram illustrating the arrangement of the portion for turning over and sucking a substrate.
Figure 6:
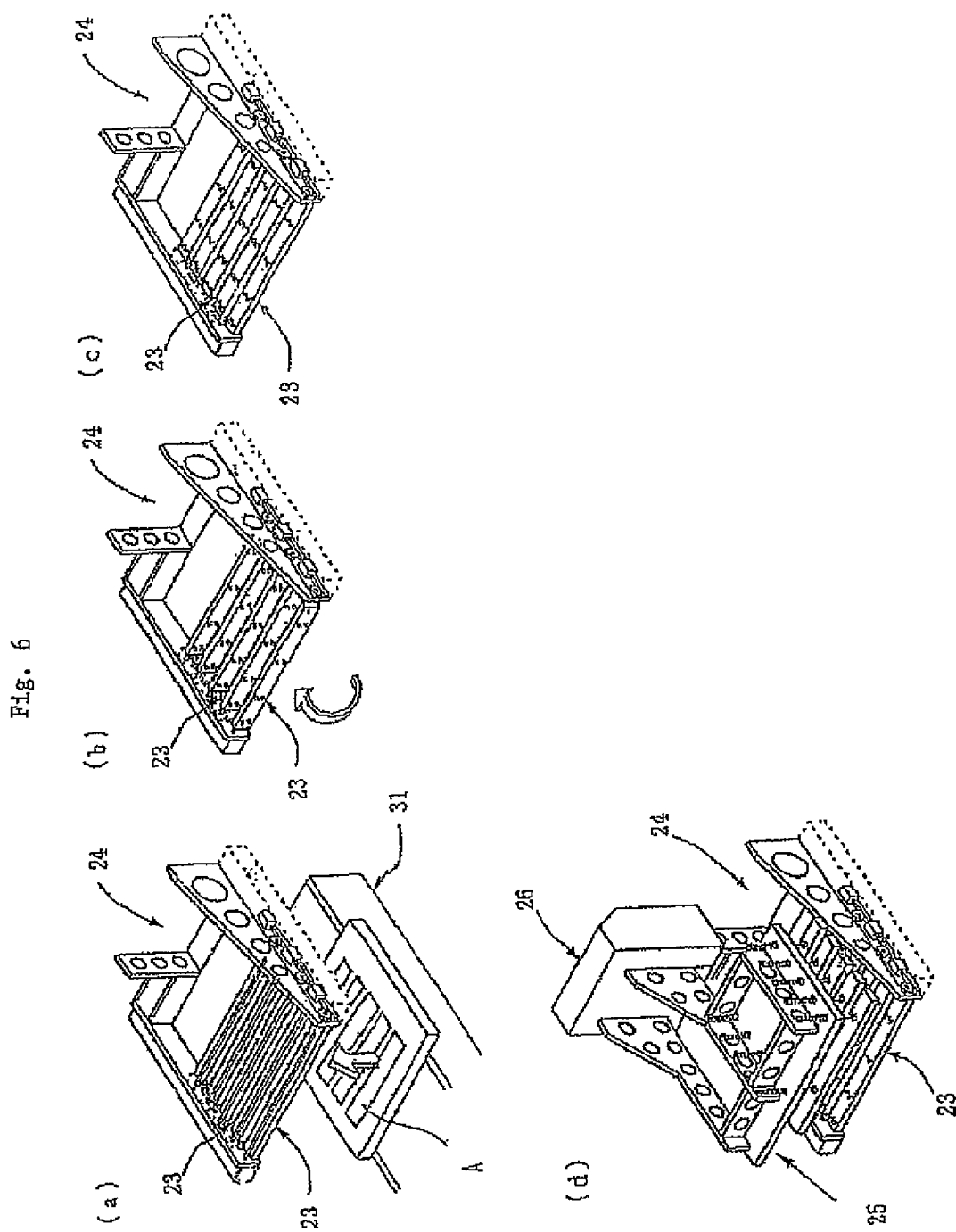
FIGS. 6(a) to 6(d) are perspective diagrams illustrating the operation of the portion for turning over and sucking a substrate.

FIG. 5 is a perspective diagram showing the arrangement of portion for turning over and sucking a substrate 23 in robot for conveying a substrate 24. Portion for turning over and sucking a substrate 23 is attached to robot for conveying a substrate 24, which can move along the top of guide rail 20 as described above, and has a number of rotational supports 51 with a sucking face which sucks and holds each substrate from a main surface.

Rotational supports 51 are respectively supported by a rotational axis 52, and both ends of these rotational axes 52 are supported by a frame 59. Rotational axes 52 are parallel to each other, extend in the longitudinal direction of rotational support 51 and pass through approximately the center portion of each rotational support 51 in the width in the direction perpendicular to the longitudinal direction.

Portion for driving the rotation, made of cylinders 75 and racks and pinions 76, is attached to frame 59. One end of rotational axes 52 is supported by frame 59 so as to be rotatable, and the other end is connected to each cylinder 75 via rack and pinion 76. Cylinders 75 are connected to a control portion, not shown. This control portion controls the angle of rotation and the direction of rotation of rotational axes 52 via the above described portion for driving the rotation.

FIGS. 6(a) to 6(d) are perspective diagrams illustrating the operation of robot for conveying a substrate 24 and portion for turning over and sucking a substrate 23. In reference to FIGS. 1, 2 and FIGS. 6(a) to 6(d), the operation of portion for turning over and sucking a substrate 23 is further described.

When robot for conveying a substrate 24 moves to a first scribing table 31, substrates where scribe lines are formed on surfaces A, which are the upper surfaces, are sucked by portions for turning over and sucking a substrate 23 (FIG. 6(a)). Next, the substrates are turned over so that surfaces A become the lower surfaces approximately simultaneously and are held (FIGS. 6(b) and 6(c)). Here, in FIGS. 6(b) and 6(c), the substrates that have been turned over are sucked on the sucking surfaces of portions for turning over and sucking a substrate 23. Next, robot for conveying a substrate 24 moves to a place above positioning table 33, and robot for conveying a substrate 26 moves to a place above positioning table 33 (FIG. 6(d)). Robot for conveying a substrate 26 has a portion for sucking the upper surface of a substrate 25, which sucks the upper surface of a substrate and holds the substrate. Robot for conveying a substrate 24 and robot for conveying a substrate 26 are formed so that they can intersect on top of guide rail 20. Portion for sucking the upper surface of a substrate 25 of robot for conveying a substrate 26 receives a substrate that is sucked and held by portion for turning over and sucking a substrate 23 of robot for conveying a substrate 24, and then, robot for conveying a substrate 24 retreats while robot for conveying a substrate 26 moves down onto the surface of positioning table 33, where suction of portion for sucking the upper surface of a substrate 25 is released so that the substrate is mounted on positioning table 33.

Positioning tale 33 has a positioning member 34 as a positioning mechanism for positioning a mounted substrate in a predetermined place on this table. Positioning member 34 positions a mounted substrate in a predetermined place on positioning table 33.

Next, robot for conveying a substrate 26 holds a substrate by sucking the upper surface of a substrate that has been positioned on the surface of table 33 by means of portion for sucking the upper surface of a substrate 25, moves to a second scribing table 35 and mounts the substrate on scribing table 35.

It is possible to adopt a configuration having a single or a number of scribe heads with a wheel cutter for scribing for scribing table 35. In addition, it is preferable for the table to be of a rotational type, or for the scribe heads to be of a rotational type, so that scribe lines can be drawn in two perpendicular directions on the table.

As the wheel cutter for scribing, the glass wheel cutter of Japanese Patent No. 3074143 is preferable.

A scribe line is drawn on surface B, which is the upper surface of a substrate, on scribing table 35. At this time, the substrate becomes of an approximately divided state. That is to say, unit substrates where cracking that has been caused through the drawing of scribe lines completely reaches the rear surface of the substrate and unit substrates where such cracking does not completely reach the rear surface of the substrates but stops in the middle in the direction of the thickness of the substrate are mixed.

Next, robot for conveying a substrate 28 moves to scribing table 35, and then, a substrate where a scribing line is drawn is held though suction of the upper surface by means of portion for sucking the upper surface of a substrate 27, and moves to a breaking conveyor 41 along the top of guide rail 20. The above described portion for sucking the upper surface of a substrate 27 is provided with a sucking surface made of a porous member. As the porous member, it is possible to use a porous material or a member that has been made porous for the porous member, and plastic foam having continuous bubbles, rubber foam, a sintered metal, knitted paper or a combination of these can be used.

Even in the case where the area of the sucking surface of the sucking member is greater than the area of contact with a substrate which makes contact with the above described sucking surface, the amount of leakage of air from the above described sucking surface is relatively small, making suction of a substrate possible when such a porous sucking face is provided. Accordingly, substrates of different sizes can be sucked and turned over.

Use of a sucking surface made of a porous member makes it possible to suck a substrate even in the case where the area of the sucking surface of portion for turning over and sucking a substrate 23 is greater than the area of contact of a substrate that makes contact with the above described sucking surface. Accordingly, even when the dimensions of the substrates change, the substrates can be treated flexibly.

Figure 7:
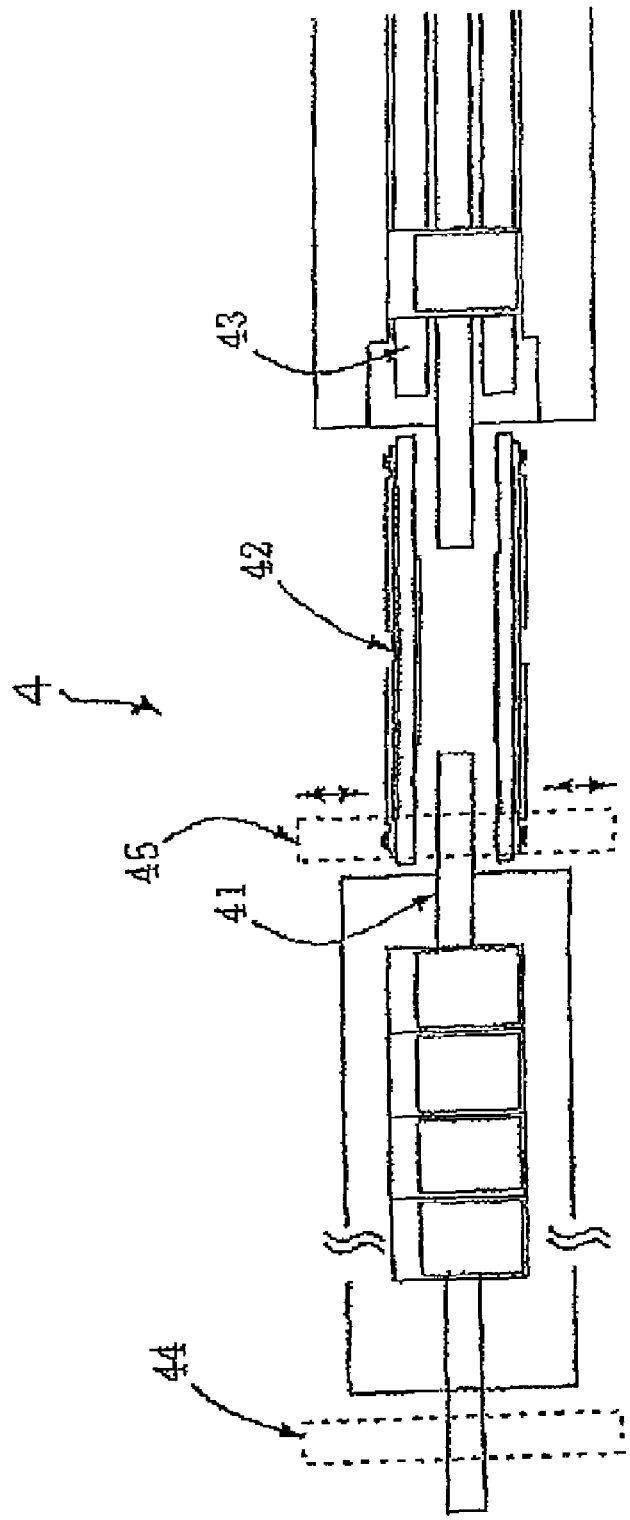
FIG. 7 is a plan diagram showing the configuration of a conveyor.

FIG. 7 is a plan diagram showing the configuration of a breaking portion 4.

Breaking portion 4 is provided with conveyor belts 41, 42 and 43 as well as breaking members 44 and 45 which are members for pressing a substrate which are placed at both ends of conveyor belt 41 in the direction of conveyance.

Conveyor belt 41 is formed of one belt, conveyor belt 42 is formed of two belts which can be translated in the direction of the arrows in the figure, and conveyor belt 43 is formed of three belts.

Robot for conveying a substrate 28 which has moved onto conveyor belt 41 releases the suction of portion for sucking the upper surface of a substrate 27 so as to mount a substrate onto conveyor belt 41.

Conveyor belt 41 conveys a substrate toward the upper stream side (leftwards in the figure) and drops a substrate from conveyor belt 41 by pushing an edge portion (unnecessary portion) on one end side of the substrate from the top with breaking member 44, which is placed on the upper stream side in the line configuration of apparatus for processing a substrate 10 which processes a substrate starting from scribing to breaking.

Next, conveyor belt 41 is driven so that the direction of conveyance of the belt points toward the lower stream side in the above described line configuration and conveys a substrate from which the edge portion on one end side has been removed toward the lower stream side (rightwards in the figure). During this conveyance operation, breaking member 45 which is placed on the lower stream side pushes the edge portion on the other end side of a substrate from the top so as to drop the substrate between the two belts of conveyor belt 42 in an opening state. Next, the state is changed so that the two belts of conveyor belt 42 are close to each other (state in the figure) and breaking member 45 pushes the portion on one end side of a substrate in strip form so that the substrate is completely divided into unit substrates and sequentially drops the unit substrates onto the two belts of conveyor belt 42 in a state of being close to each other.

The divided unit substrates are conveyed by conveyor belt 42 and then by conveyor belt 43 and then are conveyed to the next process.

Here, though in the above described embodiment an example where a substrate which is sucked by portion for turning over and sucking a substrate 23 is a small mother substrate which has been divided from a mother substrate and is the substrate in strip form is described, the above described operation can be applied to an original mother substrate in the case where a mother substrate has a width that is smaller than the length and width of rotational support 51. That is to say a mother substrate can be sucked by the portion for turning over and sucking a substrate without undergoing the process of dividing the substrate into pieces in strip form in advance.

In addition, a substrate that is sucked by portion for turning over and sucking a substrate 23 may be a mother substrate in a state where a scribe line is partially formed in advance but the substrate is not completely separated. In this case, it is also possible to divide a substrate simultaneously with the time when portion for turning over and sucking a substrate 23 rotates by placing the portion of the substrate where the scribe line is drawn in the bordering portion between adjacent portions for turning over and sucking a substrate 23.

Here, it is practically preferable for a substrate to be rotated by the suction member to have a longitudinal side which does not exceed 1 m and a thickness which does not exceed 1.5 mm. In the case where the dimensions are as described above, the area for installation of the apparatus that is required for the rotation can be reduced and the occurrence of warping in a substrate can be minimized.

Second Embodiment

In the following the apparatus for processing a substrate according to the second embodiment of this invention is described in reference to FIGS. 8 to 10.

Though, in the first embodiment, the distance between axis lines of the rotational axis of adjacent suction members is constant in robot for conveying a substrate 24 has suction members so that substrates which are placed on a table in advance at intervals which agree with the distance between the axis lines are sucked and turned over, in the second embodiment, an example of a robot for conveying a substrate having a configuration where the distance between the axis lines of the rotational axis of adjacent suction members is varied in accordance with the intervals of substrates which are mounted on a table in advance and then the substrates which are mounted on the table are sucked and turned over is described.

Figure 8:
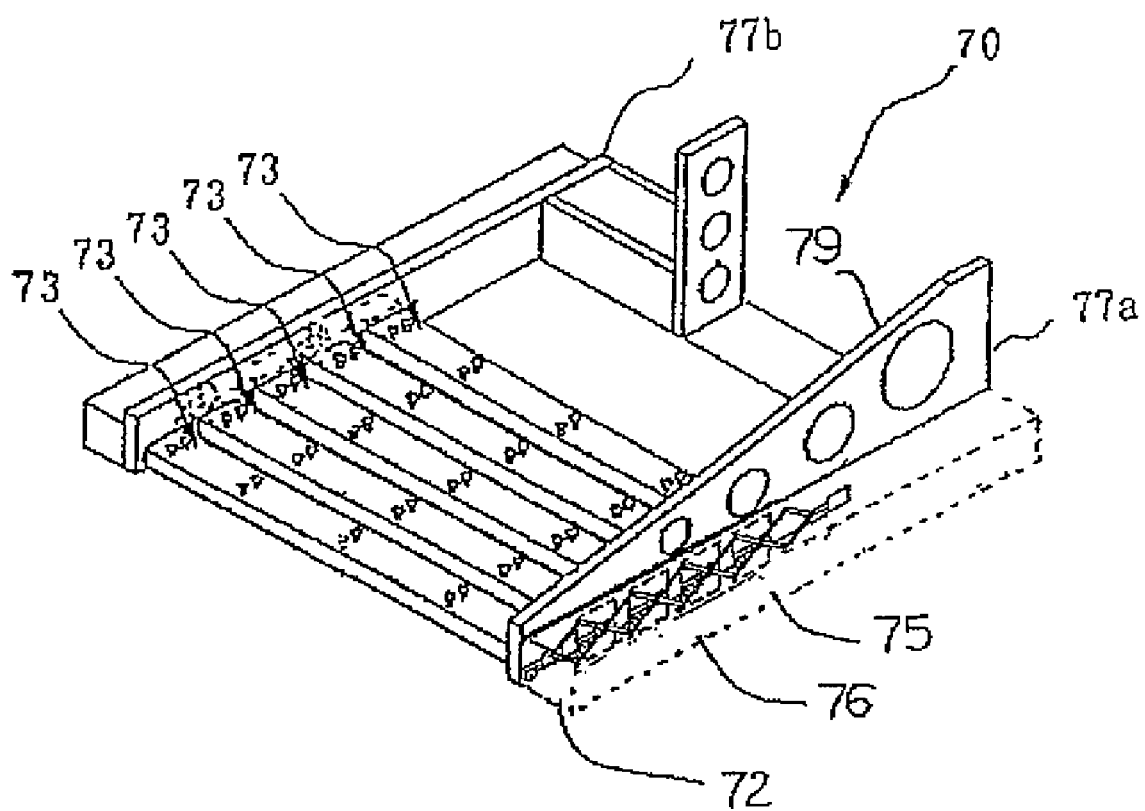
FIG. 8 is a perspective diagram showing another example of a portion for turning over and sucking a substrate.

As shown in FIG. 8, a portion for turning over and sucking a substrate 70 has a frame 79 having a side plate 77a and a side plate 77b, rotational supports 73 of which the axes are supported by frame 79 via rotational axes 72, rack pinion 76 made of a pinion and a rack and a cylinder 75 and is formed of a portion for driving a rotational axis which rotates rotational axes 72 of rotational supports 73 and a portion for shifting a rotational axis which varies the distance between axis lines of adjacent rotational axes 72 before or at the time when rotational axes 72 are rotated.

Frame 79, rotational supports 73 and the portion for driving a rotational axis have the same configurations as those in the first embodiment, and therefore, the descriptions thereof are omitted.

Figure 9:
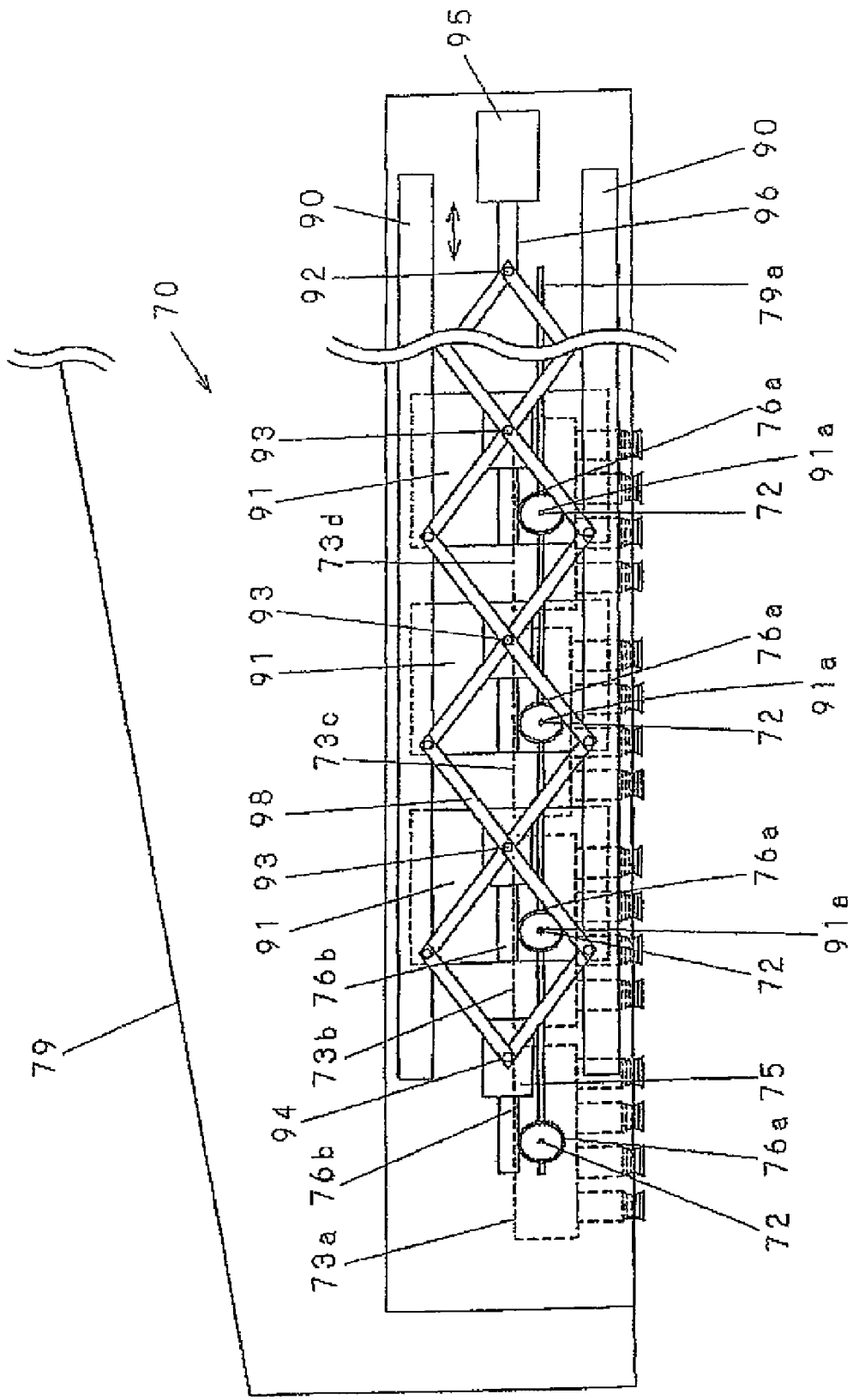
FIG. 9 is a diagram showing the configuration of the portion for shifting a rotational axis of FIG. 8.

Next, the configuration of the portion for shifting a rotational axis is described in reference to FIG. 9.

A pair of rails 90 which are above and below parallel to each other are placed in the lower portions of the outer sides of side plate 77a and side plate 77b of frame 79. A number of bases 91 are attached between rails 90 so as to be slidable along rails 90 in the leftward and rightward directions. The above described rack 76b and a cylinder 75 are secured to each base 91 and a hole 91a through which a rotational axis 72 penetrates so as to be rotatable is provided. Meanwhile, both ends of each of rotational axes 72 of rotational supports 73 (73a to 73d . . . 73n) are inserted into long holes 79a which are respectively provided on the two sides of frame 79 so as to be movable. One end of each rotational axis 72 penetrates through hole 91a which is provided in a base 91 and has a pinion 76a attached thereto.

A pinion gear 76a is engaged to the above described rack 76b which is secured to base 91. Rotational supports (73a to 73d . . . 73n), rack pinion 76 made of pinion 76a and rack 76b, cylinder 75 and base 91 form a movable unit. However, rack 76b and cylinder 75 which engage rotational support 73a on the left in the figure via rotational axis 72 and pinion 76a are not secured to base 91, but secured to frame 79.

Furthermore, the portion for shifting a rotational axis is provided with a linking mechanism 98 in pantograph form which expands and contracts in one direction. A node 94 at one end of linking mechanism 98 in the longitudinal direction in the figure is secured to cylinder 75 on the left in the figure (that is to say, is secured to frame 79). In addition, a node 92 at the other end is secured to one end portion of a rod 96 of cylinder 95 (cylinder for linking mechanism 98) that is secured to frame 79.

Other nodes 93 of linking mechanism 98 are connected to cylinders 75, which are secured to the top of base 91 (that is to say, secured to base 91). Cylinder 95 can shift rod 96 in the direction of the arrows in the figure.

Next, the operation of the portion for shifting a rotational axis is described.

When cylinder 95 moves rod 96 in one direction, for example, towards the right side in FIG. 9, respective nodes 93 of linking mechanism 98 can shift rotational axes 72 in the same direction by the same distance along long holes 79a via cylinders 75, which are secured to the top of base 91.

Figure 10:
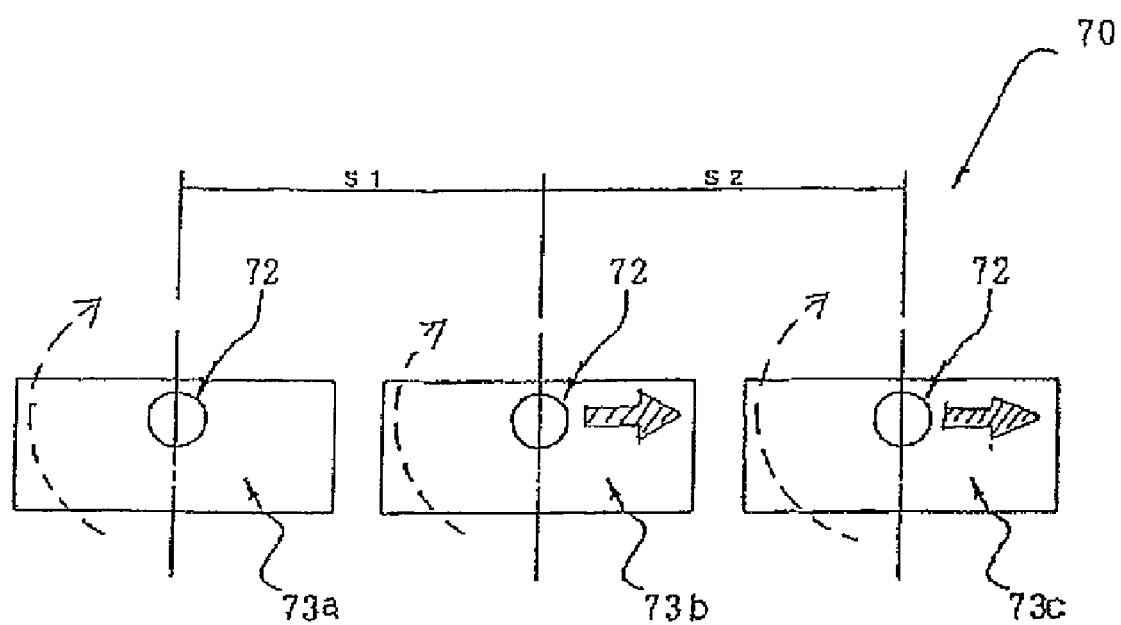
FIG. 10 is a diagram showing the operation of the portion for shifting a rotational axis of FIG. 9.

That is to say, as shown in FIG. 10, rotational support 73a on the left in the figure does not change its position while respective rotational supports 73 (73a to 73d . . . 73n) on the right side thereof shift in the direction of the arrows in the figure.

As described above in the second embodiment, distance S1 or S2 between axis lines of adjacent rotational axes 72 can be changed before or at the time when rotational axes 72 are rotated.

In the configuration of such a portion for shifting a rotational axis, even in the case where the dimensions of substrates, which are placed on the table, or the intervals between the substrates differ from each other, these can be sucked, held and rotated without fail.

Third Embodiment

In the following, the apparatus for processing a substrate according to the third embodiment of this invention is described in reference to FIGS. 11 to 14.

In the third embodiment, an apparatus for separating a substrate, which separates a substrate along a scribe line, is described as a modification which uses a robot for conveying a substrate 70 having a leaking mechanism 98 in pantograph form as described in the second embodiment. That is to say, in the third embodiment, an example of a configuration which has a number of rotational axes to which suction members are attached, a portion for driving a rotational axis, which is the same as those used in the above described first and second embodiments, a frame to which the portion for driving a rotational axis and the number of rotational axes are attached so that the rotational axes can be rotated by the portion for driving a rotational axis, at least one suction member unit formed of a portion for shifting a rotational axis, which changes the distance between axis lines of the number of rotational axes that are attached to the frame, and a unit supporting portion for supporting a number of suction member units, which are the same as the above described suction member unit, in such a manner that these can approach and retreat from each other, and where a mother substrate is separated into unit substrates by means of the suction member through the operation of the portion for shifting a rotational axis, is described.

Figure 11:
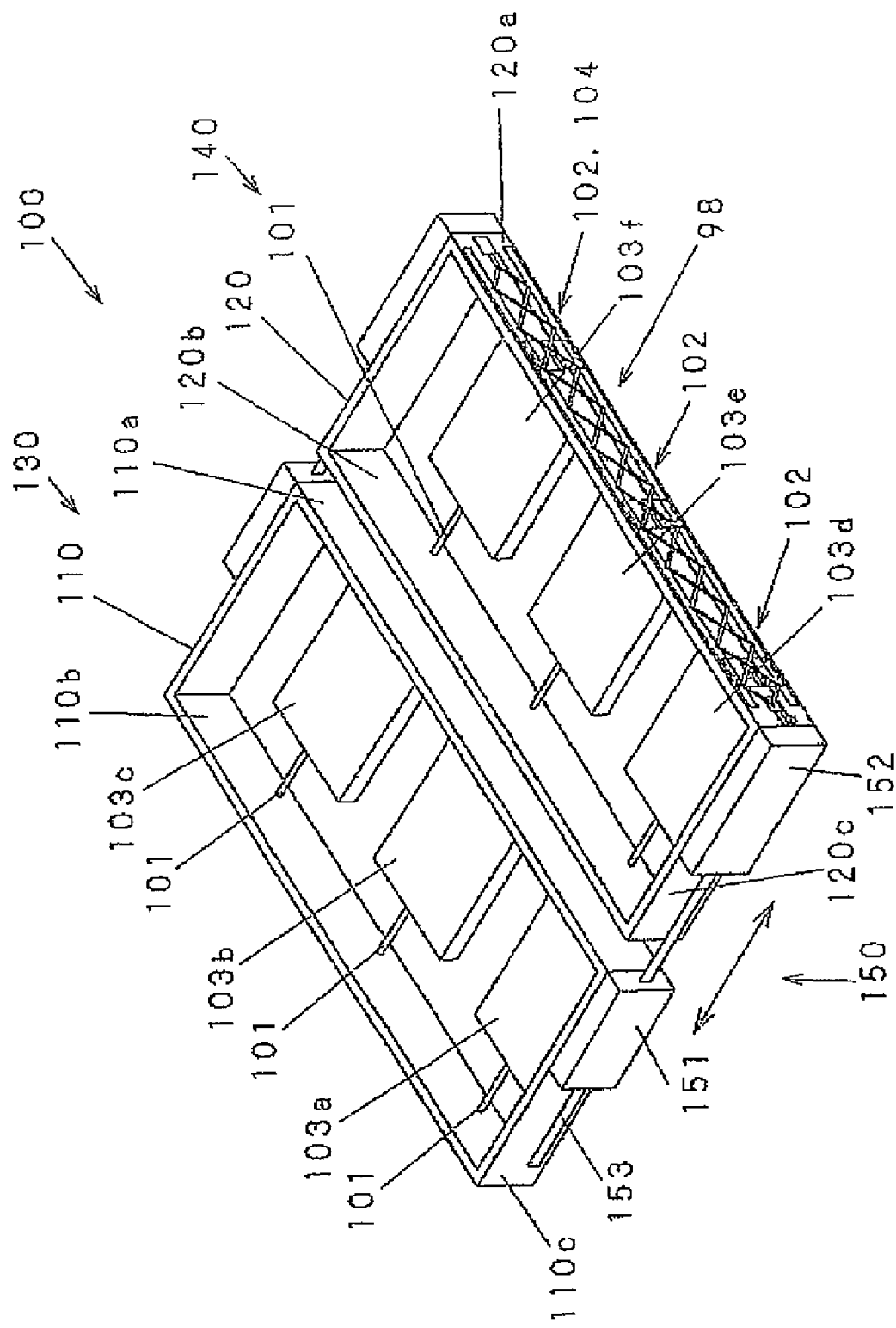
FIG. 11 is a diagram showing the configuration of an apparatus for separating a substrate according to the third embodiment.

As shown in FIG. 11, an apparatus for separating a substrate 100 has a number of rotational axes 101 to which suction members 103a to 103f are attached, a portion for driving a rotational axis 102 and frames 110 and 120 to which the number of rotational axes 101 and portion for driving a rotational axis 102 are attached so that rotational axes 101 can be rotated by portion for driving a rotational axis 102.

As described in the above first and second embodiments, the portion for driving a rotational axis 102 has a rack pinion made of a pinion and a rack, and a cylinder 75 as a portion for driving a rotational axis which rotates rotational axes 101.

Portions for shifting a rotational axis 104, which change the distance between axis lines of the number of rotational axes 101, are attached to a side plate 110a and a side plate 110b which face each other in frame 110, as well as a side plate 120a and a side plate 120b, which face each other in frame 120 (here, FIG. 11 does not show the portions for shifting a rotational axis which are attached to side plates 110a, 110b and 120b), and thereby, suction member units 130 and 140 are formed.

Suction member units 130 and 140 are respectively supported by a pair of portions for supporting a unit 150 that are provided on the outside of side plates 110c and 120c, which do not face each other, of suction member units 130 and 140.

Portions for supporting a unit 150 are made of a bowl nut portion 151, a driving portion 152 and a bowl screw 153, which are attached to the outside of side plates 110c and 120c of suction member units 130 and 140, and support suction member units 130 and 140 in such a manner that support suction member units 130 and 140 can approach and retreat from each other in the direction of the arrows in the figure.

In the following, an example of the operation for separating a mother substrate into unit substrates using the apparatus for separating a substrate 100 is described.

FIGS. 12(A) to 12(D) are diagrams schematically showing the configuration of a mother substrate M for a liquid crystal panel which is made of two glass substrates, a TFT substrate and a CF (color filter) substrate, bonded together, and the process for separating mother substrate M into unit substrates.

FIG. 12(A) is a plan diagram showing mother substrate M for a liquid crystal panel. Mother substrate M has a sealant Z, which is located between two glass substrates for bonding them together, and in which an injection hole P, through which liquid crystal is injected into a gap surrounded by sealant Z, is provided.

FIG. 12(B) is a side diagram showing a state where scribe lines are drawn on the surfaces of the two glass substrates in order to gain six unit substrates W from mother substrate M. Though the method for drawing a scribe line on mother substrate M for a liquid crystal panel, which is formed of two glass substrates bonded together, may be any method such as a method using a cutter wheel or a method using laser scribing, it is preferable to use the method that is disclosed, for example, in Japanese Patent No. 3042192.

FIG. 12(C) shows a state where the substrate is broken using a breaking apparatus along the scribe lines that have been drawn as shown in FIG. 12(B). After this breaking process, mother substrate M is separated into unit substrates W as described below.

FIG. 12(D) is a diagram schematically showing the process of separating mother substrate M into unit substrates W Mother substrate M for a liquid crystal panel is mounted so that the TFT substrate makes contact with the table, and the CF (color filter) substrate, which has the display surface, faces upwards.

Figure 13:
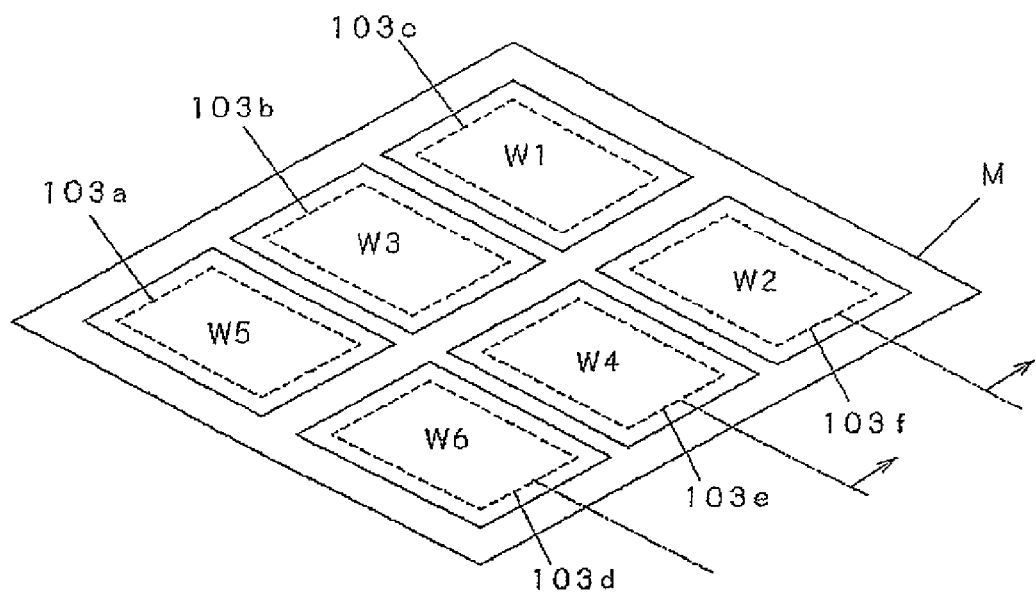
FIG. 13 is a diagram illustrating step-by-step the operation of separating mother substrate M into unit substrates W using the apparatus for separating a substrate according to the third embodiment.
Figure 14:
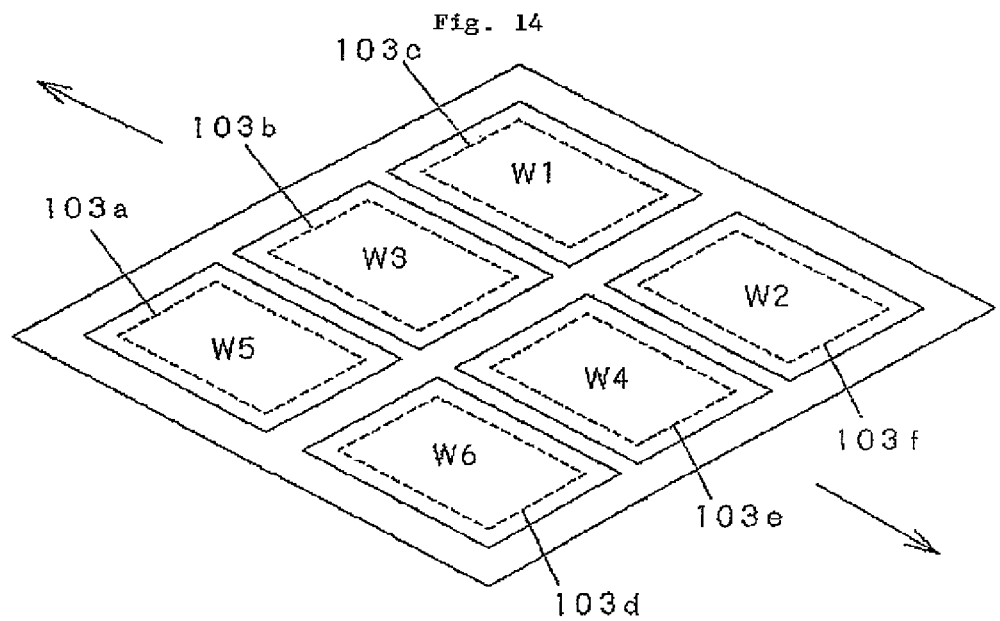
FIG. 14 is a diagram illustrating step-by-step the operation of separating mother substrate M into unit substrates W using the apparatus for separating a substrate according to the third embodiment.

FIGS. 13 and 14 are diagrams showing the steps of the operation for separating mother substrate M into unit substrates W using the apparatus for separating a substrate 100.

Figure 12:
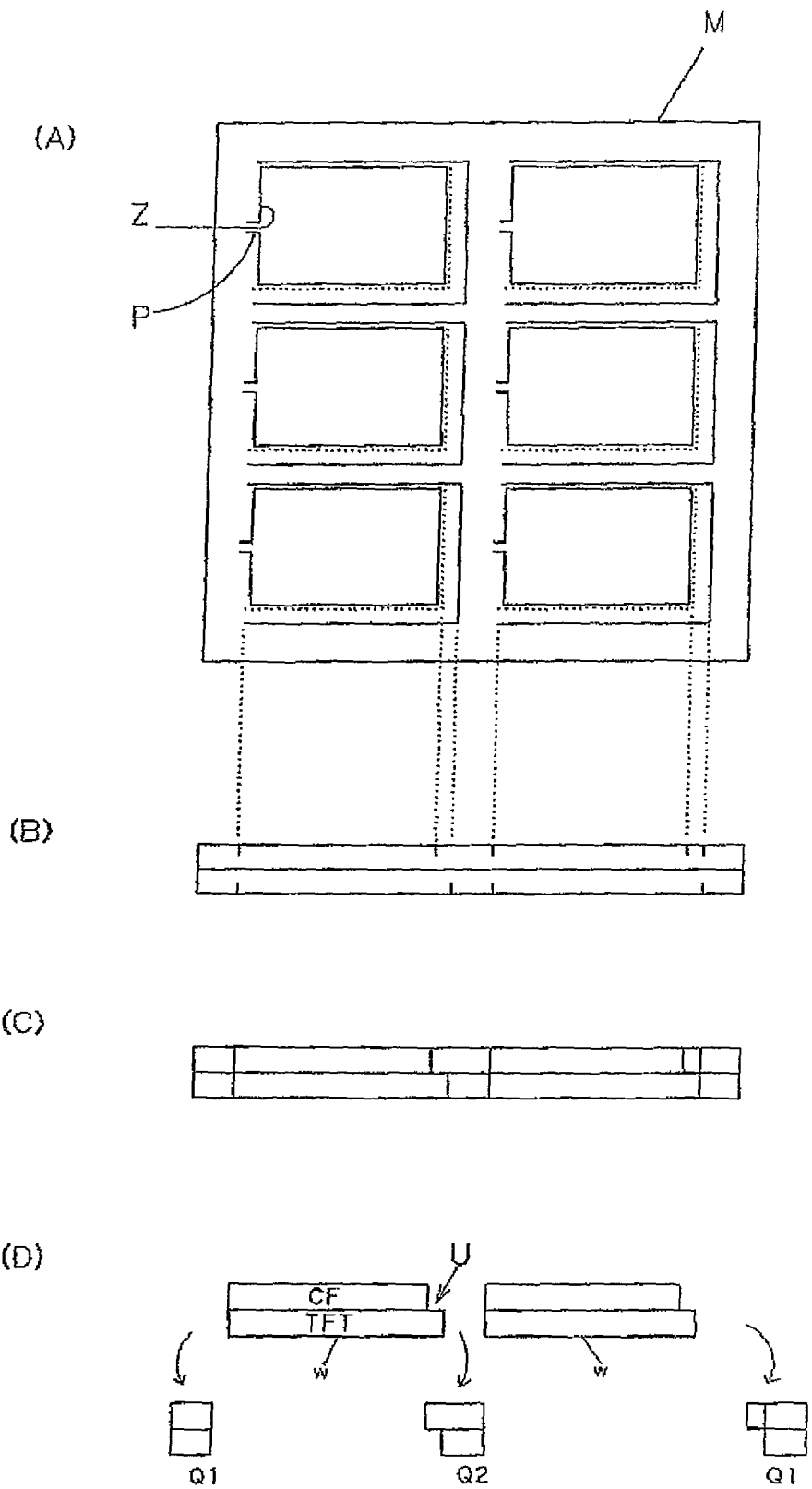
FIGS. 12(A) to 12(D) are diagrams schematically illustrating the configuration of a mother substrate M for a liquid crystal panel, and a process for separating mother substrate M into unit substrates.

After the breaking step shown in FIG. 12(C), mother substrate M is separated into unit substrates W. In the following, the operation of the apparatus for separating a substrate 100 in this step is concretely described in reference to FIGS. 11 to 14.

First, as shown in FIG. 13, suction members 103a to 103f of the apparatus for separating a substrate 100 are respectively adjusted to the locations of unit substrates W in mother substrate M, which has been mounted onto the table. That is to say, the portion for shifting a rotational axis 104 (which is the same as the portion for shifting a rotational axis of FIG. 9) is made to operate so that the respective intervals between w1 and w3, between w3 and w5, between w2 and w4 as well as between w4 and w6 coincide with the distance between the actual lines of rotational axes 101. In addition, the pair of portions for supporting a unit 150 are made to operate so that the respective intervals between w1 and w2, w3 and w4 as well as w5 and w6 coincide with the gap between suction member units 130 and 140.

Next, respective suction members 103a to 103f of the apparatus for separating a substrate 100 are lowered from the place above mother substrate M, which is mounted onto the table, so as to suck and be secured to mother substrate M in the locations of unit substrates W. Next, respective suction members 103a to 103f of the apparatus for separating a substrate 100, which have sucked mother substrate M, are raised off the table and are stopped.

Next, the portions for shifting a rotational axis 104 are made to operate so as to change the distance between the axis lines of rotational axes 101 of suction members 103a through 103f. At this time, suction member 103a and suction member 103b stay secured and the axis line of the respective rotational axes 101 do not change, and suction member 103b and suction member 103c as well as suction member 103e and suction member 103f move by equal distance in the directions of the arrows in FIG. 13. As a result, mother substrate M is separated into three pieces with one made of w1 and w2, one made of w3 and w4, and one made of w5 and w6. At this time, as shown in FIG. 12(D), unnecessary members Q2 (which are referred to as "middle margins") between W1 and W3, between W3 and W5, between W2 and W4 as well as between W4 and W6 are detached from mother substrate M so as to drop by their own weight. Here, though FIG. 12(D) only shows one cross sectional diagram as viewed from one side of mother substrate M, unnecessary members Q2 (middle margins) exist in the same manner in another cross section diagram as viewed from the side that is perpendicular to the above described cross sectional side view of mother substrate M.

Next, as shown in FIG. 14, the pair of portions for supporting a unit 150 are made to operate so as to change the gap between suction member unit 130 and suction member unit 140. That is to say, suction members 103a to 103c and suction members 103d to 103f move away from each other in the directions shown by the arrows in the figure. As a result, the piece made of w1 and w2, the piece made of w3 and w4, and the piece made of w5 and w6 are respectively separated so as to be six unit substrates W, including w1 to w6.

At this time, as shown in FIG. 12(D), unnecessary members Q2 (which are referred to as "middle margins") between W1 and W2, between W3 and W4 as well as between W5 and W6 are detached from mother substrate M so as to drop by their own weight.

Cut out members Q1 in the periphery portion of mother substrate M (Q1 have been in a state of almost being cut) are automatically detached so as to drop when the above described suction members 103a to 103f move in the two directions, longitudinal and lateral directions. Only unit substrates W remain on respective suction members 103a to 103f of suction member unit 130 and suction member unit 140 in a state of being sucked. These unit substrates W are conveyed in the state they are in or in a state where respective suction members 103a to 103f have been turned over through the operation of the portions for driving a rotational axis 102 so that unit substrates W are appropriately positioned for the next process.

In the third embodiment, unnecessary members Q2 and the like between unit substrates W are detached from mother substrate M so as to drop by their own weight (unnecessary members which cannot be detached may be made to drop by a pressing means, if necessary) when the above described suction members 103a to 103f move in the two directions, longitudinal and lateral directions, and therefore, only unit substrates W can be made to remain on respective suction members 103a to 103f of suction member units 130 and 140 in a state of being sucked.

In a conventional case where a substrate is mounted onto a table with the CF substrate having the display side for a liquid crystal panel being on the upper side, as shown in FIG. 12(D), it is troublesome to remove unnecessary members Q2 such as middle margins due to the protrusion of terminal portions U of the TFT substrates. That is to say, it is difficult for unnecessary members Q2 such as middle margins to be pulled upwards by suction because their dimensions are small, and the terminal portions which are exposed from the end portions of the TFT substrates can be easily damaged when unnecessary members Q2 are pushed downwards. In accordance with the method according to the third embodiment, however, respective suction members 103a to 103f, which have sucked the regions of unit substrates W of a mother substrate M, can be moved by an arbitrary distance in the two actual directions, and therefore, unnecessary members Q2 can be removed and dropped.

In addition, in this system, unnecessary members Q2 such as middle margins are removed in a state where the CF substrate having the display side for a liquid crystal panel is placed on the upper side so as not to make contact with the table, and therefore, the CF substrate can be prevented from being damaged.

Here, though in the above described respective embodiments, a rack pinion 76 made of a pinion and a rack, and a cylinder 75 are used as a portion for driving a rotational axis which rotates a rotational axis 72 of a rotational support 73, a configuration, where a servo motor having a gear head is connected to a rotational axis 72, can be used instead of the above.

In addition, though in the above described second and third embodiments, a linking mechanism 98 in a pantographic system is used in the portions for shifting a rotational axis so as to provide a configuration where a number of moveable units formed of a rotational support (73*b*, 73*c*, 73*d*, . . . 73*n*), a rack pinion 76 made of a pinion 76*a* and a rack 76*b*, a cylinder 75 and a base 91 can be moved simultaneously, each of these moveable units may be individually synchronized with and moved by a servo motor in the configuration.

In addition, in the above described respective embodiments, though an application of the present invention to a bonded substrate is described, the invention can be applied to a single substrate.

As an example of an application, an embodiment can be cited where a first processing step is carried out on surface A, which is one surface of a substrate, then the substrate where a predetermined process has been carried out on the main surface is sucked and held from the main surface using a number of suction members, each of which is provided with a suction surface, and the above described suction members are sequentially or approximately simultaneously rotated, and thereby, the two main surfaces of the above described substrate are turned over in the upward and downward directions, and then, a second processing step is carried out on surface B, which is the other surface of the substrate.

Furthermore, those skilled in the art would easily understand that the robot for conveying a substrate 70, which is described in the above second embodiment, and the apparatus for separating a substrate 100, which is described in the above third embodiment, can be appropriately modified without deviating from the gist of the invention so as to be applied to the apparatus for processing a substrate 100, which is described in the above first embodiment.

INDUSTRIAL APPLICABILITY

The present invention can be used for a substrate process on, for example, a substrate or the like that is used for a liquid crystal display panel.

The invention claimed is:

1. A substrate process apparatus, comprising:
a first scribing portion for creating a scribe line on a first main surface of a plurality of substrates mounted and aligned on a first table;
a second scribing portion for creating a scribe line on a second main surface of the plurality of substrates as the plurality of substrates are mounted and aligned on a second table after being processed in the first scribing portion, so that the second main surface, which is on the side opposite to the first main surface, faces upward; and
a conveying robot for collectively conveying the plurality of substrates at the same time between the first scribing portion and the second scribing portion and flipping the respective substrates so that either the first surface or the second surface faces upward during conveyance, the conveyance robot being used to convey the substrates, characterized in that
the conveying robot is provided with a number of suction members, each of the suction members having a suction surface and a rotational axis for flipping said suction surface upside-down by rotating by 180°, the rotational axes for the suction members being supported in such a state as to be spaced from and aligned parallel to each other, and is provided with a substrate sucking and rotating means for simultaneously rotating the suction members around their respective rotational axes so that the plurality of substrates held by the suction surfaces are simultaneously flipped,
wherein the rotational axis of each suction member extends in the longitudinal direction and passes through approximately the center in the width in the lateral direction; and
wherein the substrate sucking and rotating means comprises: a rotational axis driving portion for rotating the rotational axis of the suction members; and a rotational axis moving portion for changing the distance between the rotational axes of adjacent suction members before or while rotating the rotational axes.

2. The substrate processing apparatus according to claim 1, wherein each of the suction members respectively holds one substrate by its suction surface.

3. The substrate processing apparatus according to claim 1, characterized by further comprising a breaking portion for breaking the substrates along the scribe line created in the first scribing portion and the second scribing portion.

* * * * *